(12) United States Patent
Busse

(10) Patent No.: US 11,697,559 B2
(45) Date of Patent: Jul. 11, 2023

(54) SYNCHRONIZATION OF CONVEYOR BELT AND DRIVE BELT OF AN INCLINED CONVEYOR

(71) Applicant: REMA TIP TOP AG, Poing (DE)

(72) Inventor: Günter Busse, Feldkirchen (DE)

(73) Assignee: REMA TIP TOP AG, Poing (DE)

( * ) Notice: Subject to any disclaimer, the term of this patent is extended or adjusted under 35 U.S.C. 154(b) by 243 days.

(21) Appl. No.: 17/413,194

(22) PCT Filed: Dec. 12, 2019

(86) PCT No.: PCT/EP2019/084928
§ 371 (c)(1),
(2) Date: Jun. 11, 2021

(87) PCT Pub. No.: WO2020/126835
PCT Pub. Date: Jun. 25, 2020

(65) Prior Publication Data
US 2022/0048716 A1 Feb. 17, 2022

(30) Foreign Application Priority Data
Dec. 21, 2018 (DE) ............ 10 2018 222 857.4

(51) Int. Cl.
*B65G 43/08* (2006.01)
*B65G 23/44* (2006.01)
(Continued)

(52) U.S. Cl.
CPC ........ *B65G 43/08* (2013.01); *B65G 17/126* (2013.01); *B65G 23/16* (2013.01); *B65G 23/44* (2013.01);
(Continued)

(58) Field of Classification Search
CPC ...... B65G 43/08; B65G 17/126; B65G 23/16; B65G 23/44; B65G 2203/0258; B65G 2203/044
See application file for complete search history.

(56) References Cited

U.S. PATENT DOCUMENTS 6,044,964 A * 4/2000 Krupa, Jr. ............ B65G 17/22
198/794
10,822,174 B2 * 11/2020 Hinterholzer .......... B65G 23/16

FOREIGN PATENT DOCUMENTS

CD 2019/0226 12/2019
CL 2021001450 A1 10/2022
(Continued)

OTHER PUBLICATIONS

World Intellectual Property Organization, International Search Report for International Application No. PCT/EP2019/084928, dated Mar. 25, 2020, 4 total pages.
(Continued)

*Primary Examiner* — Gene O Crawford
*Assistant Examiner* — Lester Rushin, III
(74) *Attorney, Agent, or Firm* — SoCal IP Law Group LLP; Guy Cumberbatch

(57) ABSTRACT

The invention relates to a device and a method for controlling a steep conveyor, comprising a control unit (15), a conveyor drive system (5) for driving a conveyor belt (2), and a sensor unit for determining a weight $G_{1-n}$ of the material to be conveyed (4) assigned to a predetermined section $T_{1-n}$ of the conveyor belt (2), wherein the sensor unit is adapted to transmit information about the weight to the control unit (15), wherein the control unit (15) is adapted to determine from the information about the weight $G_{1-n}$ a length $L_{1-n}$ assigned to the predetermined section $T_{1-n}$ in a steep conveyor region S of the conveyor belt (2) and to adjust a strain of a drive belt (2) of the conveyor drive
(Continued)

system (5) based on the determined lengths $L_{1-n}$ assigned to the predetermined sections $T_{1-n}$.

20 Claims, 2 Drawing Sheets

(51) Int. Cl.
*B65G 17/12* (2006.01)
*B65G 23/16* (2006.01)

(52) U.S. Cl.
CPC ............... *B65G 2203/0258* (2013.01); *B65G 2203/044* (2013.01)

(56) References Cited

FOREIGN PATENT DOCUMENTS

| | | |
|---|---|---|
| CN | 103224118 A | 7/2013 |
| DE | 3235471 A1 | 3/1984 |
| WO | 2005035404 A1 | 4/2005 |
| WO | 2018153651 A1 | 8/2018 |
| WO | 2020126835 A1 | 6/2020 |
| ZA | 2021/03586 B | 1/2023 |

OTHER PUBLICATIONS

Chilean Patent Office, Office Action for Application No. 202101450, dated May 18, 2022, 13 total pages.
Chinese Intellectual Property Office, Office Action for Application No. 201980084568.7 , dated Sep. 28, 2022, 10 total pages.

\* cited by examiner

SYNCHRONIZATION OF CONVEYOR BELT AND DRIVE BELT OF AN INCLINED CONVEYOR

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/EP2019/084928, filed Dec. 12, 2019, entitled "SYNCHRONIZATION OF CONVEYOR BELT AND DRIVE BELT OF AN INCLINED CONVEYOR", which claims priority to German Patent Application No. 10 2018 222 857.4, filed Dec. 21, 2018, all of which are incorporated herein by reference in their entirety.

BACKGROUND

The invention relates to a device and a method for controlling a steep conveyor, wherein synchronization of the conveyor and drive belt enables wear to be reduced, the service life of the components to be extended and/or operation to be as low-friction as possible.

A steep conveyor has the object to transport the material to be conveyed or bulk material diagonally to vertically upwards. The conveyor belt in most cases has corresponding drive profiles on the drive side. The conveyor side of the conveyor belt is, for example, equipped with driving devices, such as corrugated edges with crossways or buckets mounted on the conveyor side.

The conveyor belt is usually driven via the drive profiles by engaging, for example, rods that are mounted on the revolving drive belt. Depending on the length of the conveyor belt, several conveyor drive systems can be installed along the conveyor line in order to move the conveyor belt over certain conveyor sections and to initiate the required drive forces in a dosed manner.

Since the conveyor belt, in addition to its own weight, is stretched differently over the differently inclined (flat, diagonal, vertical, downhill) conveyor line, depending on the pretension and loading condition, there may be an increase in wear and a reduction in the service life of the coupling system of conveyor belt and drive belt, as a change in the separation or distance of the tooth profiles of the conveyor belt may result. Therefore, the tooth profiles of the conveyor belt no longer fit optimally into the coupling profiles of the conveyor drive system so that increased wear of the components up to skipping of the drive system can occur.

It is an object of the invention to create a device and a method for controlling a steep conveyor which allow a reduced wear and an increase of the service life of the drive components.

According to the invention, a device for controlling a steep conveyor is provided which has a control unit enabling synchronization of the conveyor belt and drive belt of the steep conveyor in such a way that precise engagement takes place between the coupling profiles of the conveyor drive system and the tooth profiles of the conveyor belt.

This can significantly increase the service life of the overall system, as the wear of the components is reduced.

Due to different loading of the conveyor belt, the dead weight of the conveyor belt, pre-tensioning induced in the conveyor belt, and different E-modules of individual conveyor belt sections, different strains of the conveyor belt result over the conveyor line. These different strains in turn lead to different distances between the tooth profiles over the conveyed length.

According to the invention, a sensor unit can be provided to determine a weight of the material to be conveyed, including the weight of the conveyor belt, wherein the weight (or partial weights) is assigned to certain sections of the conveyor belt. The control unit can assign a specific weight to each part of the conveyor belt (digital twin).

From the different partial weights, the control unit can furthermore determine a length L of the respective sections T in a steep conveyor region S of the conveyor belt. From these partial lengths, the control unit can then determine the desired distances B of the coupling profiles of the drive belt through the steep conveyor region S and adjust a strain of the drive belt in such a way that a synchronized and adapted division of the coupling profiles to the tooth profiles results.

Instead of adjusting a center distance C of deflection rollers of the conveyor drive system, it is also possible to apply a corresponding strain force to the drive belt via one or more additional rollers.

It should also be expressly noted that the tooth profiles can be provided on the drive belt and the coupling profiles on the conveyor belt (conversely to the configuration described below).

Due to the adapted distance between the coupling profiles of the drive belt engaging in the tooth profiles, optimum engagement and thus optimum power transmission is possible so that less wear due to relative movements, a longer service life of the components, and low-friction operation are achieved. Furthermore, it can be ensured that the drive system is not skipped and that operating events such as the failure of one or more drive systems also do not lead to a problem.

The synchronization of the conveyor belt and the drive belt can be achieved by a variable adjustment of the pre-tension and thus of the strain of the drive belt so that the mounted coupling profiles of the drive belt are adjusted in their separation to the current separation of the tooth profiles of the conveyor belt.

In order to adjust the strain/pretension of the drive belt, the current strain of the conveyor belt can be determined immediately before the coupling profiles engage in the tooth profiles.

At this point it should be noted that the coupling profiles can also be provided on the conveyor belt and the tooth profiles on the drive belt.

The determination of the current strain of the conveyor belt immediately before the coupling profiles engage in the tooth profiles can be carried out by means of a corresponding calculation and/or simulation, by determining the exact loading condition and the position of the loading condition along the conveyor section for each or at least for relevant positions and from this the resulting strain over the conveyor line (digital twin).

The conveyor line can be inclined differently in different sections. A part of the conveyor line may be flat or horizontal, another part may be inclined upwards or downwards at a certain angle and/or another part may be vertical upwards. Due to the resulting different weight forces acting on the conveyor belt and additionally due to the resulting different weight forces due to the material being conveyed, wherein in addition the material being conveyed was not evenly and/or not homogeneously filled onto the conveyor belt, different lengths or elongations/strains of the conveyor belt result depending on the respective E-module or the respective E-modules (in the case of different conveyor belt sections) of the conveyor belt.

According to the invention, it is possible to determine the resulting strain at any position of the conveyor line, in particular at the inlet of the conveyor belt to the drive belt.

This can be achieved by taking various measured variables (e.g. loading of the conveyor belt) and by the parameters of the conveyor belt (tension/strain behavior) as well as of the drive belt. A permanent digital image of the conveyor system is created, a so-called digital twin. Thereby, the strain state or the partial length in certain sections of the conveyor belt can be determined and thus used as a manipulated variable for the adjustment of the pretension/strain of the respective conveyor drive system.

A sensor unit containing a weighing device may be provided. The weighing device can transmit the determined weight to the control unit. The weight transmitted to the control unit is assigned to a predetermined section of the conveyor belt.

The sensor unit can include a sensor that transmits information about a filling quantity with material to be conveyed to the control unit. The control unit can be adapted to determine a weight from this information.

Furthermore, one or more signal transmitters can be provided on the conveyor belt at predetermined distances in the longitudinal direction of the conveyor line 19. These signal transmitters can be detected by a position sensor which transmits position information to the control unit. The control unit can be adapted to assign the respective weight of the material to be conveyed to the predetermined sections based on the position information. The control unit can therefore be adapted to have accurate information at any time about which conveyor belt section is where the signal transmitter can be configured as an optical signal transmitter, as a mechanical signal transmitter, as an electromagnetic signal transmitter (e.g. Hall sensor) and/or as an X-ray source. The corresponding position sensor in each case can be adapted to receive the position signals.

The position signals emitted contain, for example, an identifier (ID) which can clearly inform the control unit at which point which part of the conveyor belt is currently located.

Due to the fact that the control unit is informed about the position of the conveyor belt on the conveyor line and due to the fact that the control unit knows the respective inclination of the conveyor line of the respective sections of the conveyor line, due to the fact that the control unit can determine the respective quantity of material to be conveyed in the respective sections and/or due to the fact that the control unit can calculate or determine the resulting lengths or elongations of the conveyor belt, it is possible to achieve optimum synchronization of the conveyor belt with the drive belt, since the separation of the coupling profiles of the drive belt can be adjusted exactly to the respective incoming distances of the tooth profiles of the conveyor belt (when the conveyor belt enters the drive belt).

The control unit can calculate the lengths and/or elongations of the conveyor belt assigned to the sections, in particular along a steep conveyor section S, based on the weight information in the predetermined sections.

Furthermore, the control unit can be adapted to determine the lengths and/or elongations of the conveyor belt assigned to the sections by means of the dead weight of the conveyor belt, the determined or calculated weight of the material to be conveyed, the E-module(s) of the conveyor belt (the conveyor belt can consist of different conveyor belt sections with different E-modules) and/or the inclination(s) of the steep conveyor section area S.

By synchronizing the drive belt accordingly or by synchronizing the strain/tension of the drive belt, very precise engagement of the drive components can be achieved, which leads to a significantly increased service life of the components and low-friction operation with optimum force application.

The control unit can be adapted to implement the determined lengths of the conveyor belt in the required distances from the coupling profiles of the drive belt. In addition, the control unit can be adapted to essentially match or synchronize an distance B between the coupling profiles of the drive belt engaging in the tooth profiles and the distances A between the tooth profiles by adapting the strain of the drive belt and thus the distance B between the coupling profiles accordingly via the actuator of the conveyor drive system. This can be done, for example, by adjusting the center distance of the deflection rollers of the drive belt accordingly and/or by using one or more additional rollers to introduce a corresponding strain force into the drive belt.

It may also be possible to determine the respective strain or length of the sections of the conveyor belt and thus the respective distances A of the tooth profiles of the conveyor belt by means of a measurement and then to use this measured variable to adjust the distances B of the coupling profiles of the drive belt accordingly. For example, profile noses can be attached to individual or all teeth in certain tooth profile sections. These can be used to provide information about the longitudinal strain of the conveyor belt at the respective measuring position.

The same can be done with regard to the strain or the separation of the coupling profiles of the drive belt. The aforementioned profile noses or markings can, for example, also be attached to the coupling profiles of the drive belt. During operation, the distance between these profile noses can then be measured and thus an optimized synchronization of the conveyor belt with the drive belt can be achieved.

It should be expressly noted here that, for example, a measurement of only the distance between two or more tooth profiles of the conveyor belt and/or the two or more coupling profiles of the drive belt may be sufficient.

The control unit can also be adapted to determine via a detection unit a distance D between an upper edge of the tooth profile and an upper side of the drive belt and to use the distance D as a readjusted controlled variable for the center distance C or the required strain/length of the drive belt, wherein the distance C or the required strain/length of the drive belt can be adapted accordingly if a predetermined limit distance $D_{Limit}$ is exceeded.

Furthermore, a method for controlling a steep conveyor is provided, which can determine the weight of a material to be conveyed via a sensor unit. This weight can be assigned to a predetermined section of the conveyor belt, wherein the sensor unit can be adapted to transmit information about the weight to a control unit. Further, a length assigned to the predetermined section in a steep conveyor section of the conveyor belt can be determined by the control unit from the weight information. It is also possible to adjust a center distance C of deflection rollers of a conveyor drive system based on the lengths assigned to predetermined sections.

The aforementioned means and measures allow the optimum synchronization of the conveyor belt and drive belt of a steep conveyor in a particularly advantageous way in order to significantly reduce the wear of the drive components, thus achieving a significantly extended service life of the drive components. Furthermore, the drive can be carried out with as little friction and as accurately as possible.

Furthermore, events such as a failure of a conveyor drive system and thus a partially greater strain of the conveyor belt can also be compensated for by synchronizing the conveyor and drive belt according to the invention.

DESCRIPTION OF THE DRAWINGS

The invention is described in more detail below on the basis of the attached schematic drawings. Therein.

DETAILED DESCRIPTION

In the following, various examples of the present invention are described with reference to the Figures. Same or similar elements in the Figures are designated with the same reference signs. However, the present invention is not limited to the described embodiments, but further comprises modifications of features of the described examples and combination of features of different examples within the scope of protection of the independent claims.

Figure 1:
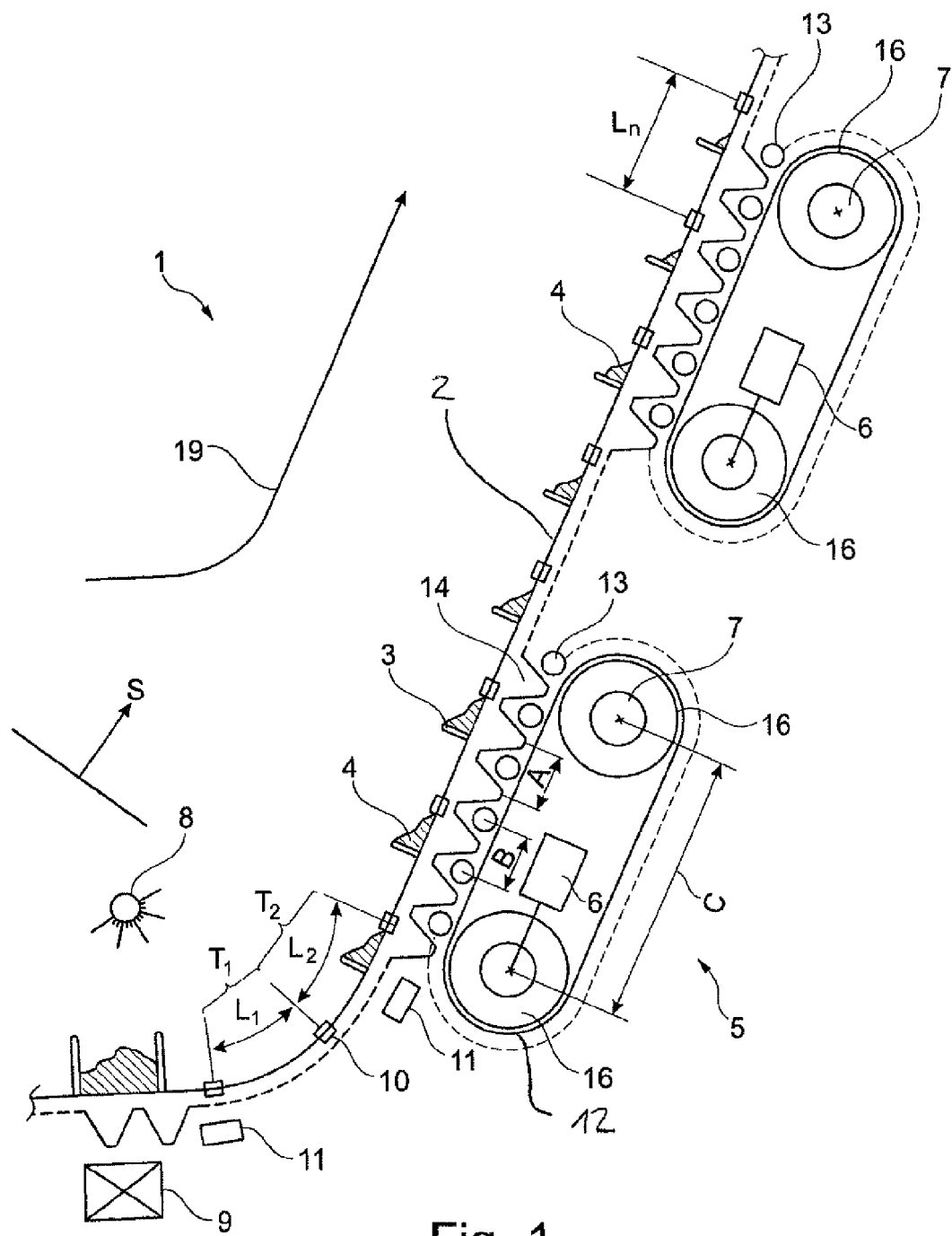
FIG. 1 shows a schematic view of the conveyor system.

FIG. 1 shows a conveyor system 1 with a conveyor belt 2. Supporting elements 3 are attached to the conveyor belt 2. The supporting elements 3 are used to ensure that the material to be conveyed 4 placed on the conveyor belt 2 does not slip off the conveyor belt 2 when it is moved upwards at an angle or vertically on a conveyor line 19.

The conveyor line 19 can be configured differently depending on the conveying requirement. For example, the conveyor line 19 can first move horizontally, then slightly inclined upwards or downwards, then vertically, then slightly inclined upwards or downwards again and then horizontally again, etc. (not shown).

Furthermore, conveyor drive systems 5 are shown, wherein only two conveyor drive systems 5 are shown as examples. Of course, depending on the requirements and conveyor section 19, several such conveyor drive systems 5 can be provided.

A weighing device 9 may be provided which can weigh the loaded material to be conveyed 4 and/or the conveyor belt 2 with applied material to be conveyed 4. The determined weight $G_{1-n}$ can then be transferred to a control unit 15 (see FIG. 2). Signal transmitters 10 are provided on conveyor belt 2. These signal transmitters 10 can be configured as optical signal transmitters, mechanical signal transmitters, electromagnetic signal transmitters and/or as an X-ray source. At this point it should be expressly noted that other signal transmitters or active or passive markings may also be provided. One or more position sensors 11 are provided to detect the passage of the signal transmitters 10. The position sensor 11 and/or an associated device is capable of assigning the passing signal transmitters 10 locally on the conveyor belt 2 in such a way that certain sections $T_{1-n}$ of the conveyor belt 2 can be defined and detected.

This makes it possible, for example, to create a digital image of the conveyor system for the device used to control the steep conveyor and thus to create a digital twin. The control unit 15 can thus assign the weight of the conveyor belt 2 with material to be conveyed 4 determined by the weighing device 9 to a section $T_{1-n}$ of the conveyor belt 2. Furthermore, the control unit 15 can add up the weights of certain sections $T_{1-n}$. In the schematic view in FIG. 1, for example, the weight of four sections $T_{1-n}$ of the material to be conveyed 4 (upper conveyor drive system 5) would be added to the weight of the conveyor belt 2 starting from the exit from the engagement of the lower conveyor drive system 5 in order to determine a corresponding elongation of the conveyor belt 2. Thereby, the dead weight of the conveyor belt 2 with the material 4 arranged on it can be taken into account. Depending on the resulting elongation or length $L_{1-n}$ of the associated sections $T_{1-n}$, for example, an actuator 6 of the conveyor drive system 5 can then be actuated in such a way that the tension or strain of the drive belt 12 is adjusted in such a way that the distances B of the coupling profiles 13 of the drive belt 12 are synchronized with the distances A of the tooth profiles 14 of the conveyor belt 2. This ensures optimum engagement of the coupling profiles 13 with the tooth profiles 14, which leads to significantly reduced wear due to relative movements, significantly reduced friction and thus a longer service life of the drive components.

FIG. 1 also shows drive units 7 of the conveyor drive systems 5, each of which drives a deflection roller 16. This deflection roller 16 in turn drives the drive belt 12 by frictional locking, for example. The actuator 6 acts, for example, on a deflection roller 16, whereby the deflection roller can be moved in the longitudinal direction. By moving the deflection roller 16 in the longitudinal direction, the tension or strain of the drive belt 12 can be adjusted so that the distance B between the coupling profiles 13 can be adjusted. By adjusting the distance B to match the previously determined distance A of the tooth profiles 14, optimum synchronization of the drive system is possible.

Based on the knowledge of the conveyor line 19 and the existing inclination of the conveyor line 19, the control unit 15 is able to determine the effective weight force on the basis of the material to be conveyed 4 located in the supporting elements 3 and the conveyor belt length. This is possible because the corresponding weight $G_{1-n}$ was determined beforehand via the weighing device 9 and assigned to a corresponding section $T_{1-n}$ via the markings and the corresponding position sensors 11.

Consequently, it is possible for the control unit 15 to determine the elongation in certain sections $T_{1-n}$ of the conveyor belt 2 and to determine when this elongation occurs where along the conveyor section. This local assignment of the length or elongations along the conveyor section of the conveyor belt 2 allows the drive belt 12 to be optimally synchronized and adjusted to the elongation.

Figure 2:
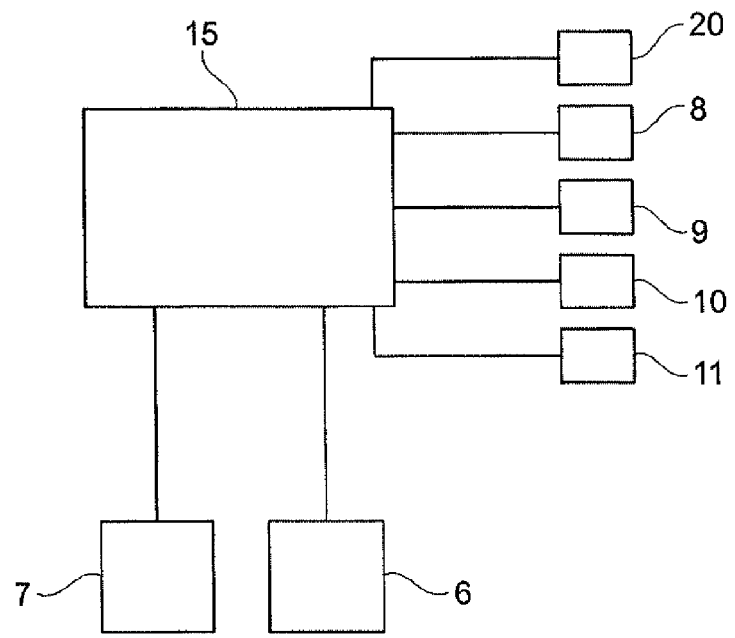
FIG. 2 shows a view of the control unit with associated units.

FIG. 2 schematically shows the control unit 15. The control unit 15 is electrically and/or wirelessly connected to the optical sensor 8, the weighing device 9, the signal transmitters 10, the position sensor(s) 11, the actuator 6, and the drive unit 7.

In particular, the optical sensor 8 can be used, for example, to detect a load of the conveyor belt 2 with material to be conveyed 4. The optical signal (for example an image) can then be transmitted to the control unit 15. The image information can then be evaluated in the control unit 15, wherein the weight $G_{1-n}$ of the material to be conveyed 4 at the point picked up (in the special section $T_{1-n}$ of the conveyor belt 2) can be inferred by means of a corresponding evaluation. Of course, this also requires the specific weight of the respective material to be conveyed. This specific weight can be stored in advance in a memory of control unit 15 that is not shown.

The control unit 15 can then deduce the corresponding elongations or lengths $L_{1-n}$ of the conveyor belt 2 along the conveyor line 19 and control the actuators 6 accordingly.

Figure 3:
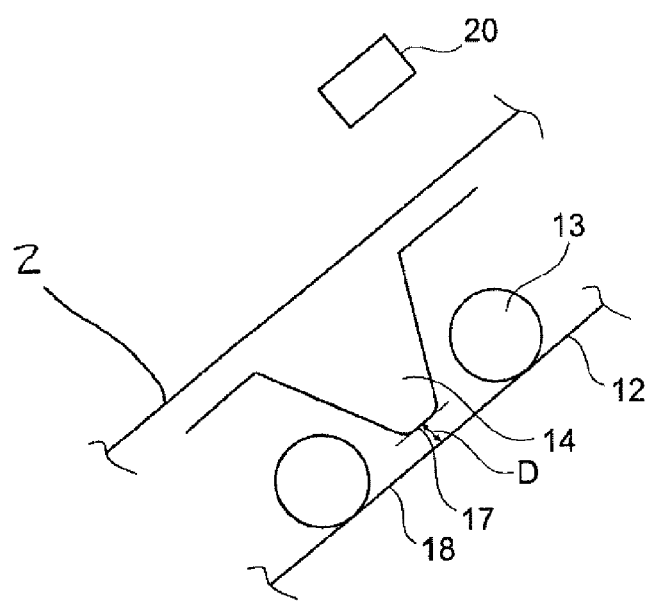
FIG. 3 shows a magnified view of the space between the conveyor belt and the drive belt.

FIG. 3 exemplarily shows the possibility of determining a distance D using an exemplarily shown distance sensor 20. This distance D can be determined between an upper side 18 of the drive belt 12 and an upper edge 17 of a tooth profile 14 of the conveyor belt 2 via the distance sensor 20 and/or a detection unit that is not shown. This detection unit or the distance sensor 20 can transmit the corresponding detection signal concerning the distance D to the control unit 15. The control unit 15 can then compare the determined distance D with a previously stored limit distance $D_{Limit}$ and, at a determined distance D greater than the limit distance $D_{Limit}$, conclude that the synchronization between drive belt 12 and conveyor belt 2 must be improved. This can be done, for example, by controlling the actuator 6 of the conveyor drive system 5 via the control unit 15 in such a way that a distance D is adjusted which is smaller than the limit distance $D_{Limit}$.

In summary, the present invention can optimally create a device and a method for controlling a steep conveyor that allow an exact engagement of the coupling profiles 13 with the tooth profiles 14, whereby the wear of the drive elements can be minimized and the service life of these components can be extended. Furthermore, a low-friction operation can be ensured. These are very important factors in such conveyor systems, as repairs can only be realized with very high effort and longer downtimes.

It is claimed:

1. Device for controlling a steep conveyor, comprising
a control unit (15),
a conveyor drive system (5) for driving a conveyor belt (2); and
a sensor unit (8) for determining a weight $G_{1-n}$ of the material to be conveyed (4), assigned to a predetermined section $T_{1-n}$ of the conveyor belt (2), wherein the sensor unit is arranged to transmit information about the weight to the control unit (15), wherein the control unit (15) is adapted
   to determine from the information about the weight $G_{1-n}$ a length $L_{1-n}$ assigned to the predetermined section $T_{1-n}$ in a steep conveyor region S of the conveyor belt (2) and, based on the determined lengths $L_{1-n}$ assigned to the predetermined sections $T_{1-n}$ to adjust a strain of a drive belt (2) of the conveyor drive system (5).

2. Device according to claim 1, wherein
the strain of the drive belt (2) is adjusted via an actuator (6) of the conveyor drive system (5) in order thereby to adjust a distance B from coupling profiles (13) of the drive belt (12).

3. Device according to claim 1, wherein the actuator (6) for adjusting the strain of the drive belt (12) and thus a distance B from coupling profiles (13) of the drive belt (12) adjusts a center distance C from deflection rollers (16) of the drive belt (12) and/or applies a corresponding strain force to the drive belt (12) via an additional roller.

4. Device according to claim 1, wherein
the sensor unit includes a weighing device (9) which transmits the weight to the control unit (15).

5. Device according to claim 1, wherein
the sensor unit (8) includes an optical sensor which transmits information about a filling quantity with material to be conveyed (4) to the control unit (15) and the control unit (15) is adapted to determine a weight from this information.

6. Device according to claim 1, wherein
the sensor unit (8) includes an ultrasonic or X-ray sensor which transmits information about a filling quantity with material to be conveyed (4) and/or specific weight of the material to be conveyed (4) to the control unit (15) and the control unit (15) is adapted to determine a weight from this information.

7. Device according to claim 1, wherein
signal transmitters (10) are provided on the conveyor belt (2) at predetermined distances in the longitudinal direction of the conveyor line (19), the position signals of which signal transmitters are detected by a position sensor (11) which transmits position information to the control unit (15), wherein the control unit (15) is adapted to assign the weight $G_{1-n}$ of the material to be conveyed (4) to the predetermined sections $T_{1-n}$ on the basis of the position information.

8. Device according to claim 4, wherein
the signal transmitter (10) is configured as an optical signal transmitter, as a mechanical signal transmitter, as an electromagnetic signal transmitter and/or as an X-ray source.

9. Device according to claim 1, wherein
the control unit (15) is adapted to determine, on the basis of the weight information in the predetermined sections $T_{1-n}$, the lengths $L_{1-n}$ and/or elongations assigned to the sections $T_{1-n}$ of the conveyor belt (2), in particular along a steep conveyor section region S or individual positions on the steep conveyor section region S.

10. Device according to claim 9, wherein
the control unit (15) is configured to determine the lengths $L_{1-n}$ and/or elongations of the conveyor belt (2) assigned to the sections $T_{1-n}$ via the dead weight of the conveyor belt (2), the detected or determined weight $G_{1-n}$ of the material to be conveyed (4), the E-modules of the conveyor belt (2) assigned to the conveyor belt section(s), a pretension of the conveyor belt (2) and/or the inclinations of the steep conveyor section region S.

11. Device according to claim 1, wherein
the control unit (15) is adapted
to implement the determined lengths $L_{1-n}$ into distances $A_{1-n}$ from tooth profiles (14) of the conveyor belt (2) and
to substantially match or synchronize a distance B of coupling profiles (13) of the drive belt (12) engaging in the tooth profiles (14) with the distances $A_{1-n}$ or an at least double separation thereof by adapting the elongation of the drive belt (12) accordingly via the actuator (6) of the conveyor drive system (5).

12. Device for steep conveyors according to claim 1, wherein
the control unit (15) is adapted to determine the elongation or length $L_{1-n}$ of the conveyor belt (2) lying in an elastic region caused by the weight force of the conveyor belt (2) and the weight of the material to be conveyed (4) in the steep conveyor section region S and to substantially adapt the distance B of the coupling profiles (13) of the drive belt (12) to the distances $A_{1-n}$ of the tooth profiles (14) by a corresponding elastic strain of the drive belt (12) via the actuator (6).

13. Device for steep conveyors according to claim 1, wherein
the control unit (15) is adapted to determine via a detection unit a distance D between an upper edge (17) of the tooth profile (14) and an upper side (18) of the drive belt (12) and to use the distance D as a readjusted controlled variable for adjusting the required strain of the drive belt (12) and thus the distances B of the coupling profiles (13), wherein the strain is adapted accordingly when a predetermined limit distance $D_{limit}$ is exceeded.

14. Method for controlling a steep conveyor, comprising the following steps:
Determining a weight $G_{1-n}$ of a material to be conveyed (4) via a sensor unit assigned to a predetermined section $T_{1-n}$ of the conveyor belt (2), wherein the sensor unit is adapted to transmit information about the weight $G_{1-n}$ to a control unit (15),
determining a length $L_{1-n}$ assigned to the predetermined section $T_{1-n}$ in a steep conveyor section S of the conveyor belt (2) from the information about the weight $G_{1-n}$ by the control unit (15), and
adjusting an elongation of a drive belt (12) of a conveyor drive system (5) based on lengths $L_{1-n}$ assigned to predetermined sections $T_{1-n}$.

15. A method according to claim 14, wherein
the strain of the drive belt (2) is adjusted via an actuator (6) of the conveyor drive system (5) in order thereby to adjust a distance B from coupling profiles (13) of the drive belt (12).

16. A method according to claim 15, wherein the actuator (6) for adjusting the strain of the drive belt (12) and thus a distance B from coupling profiles (13) of the drive belt (12) adjusts a center distance C from deflection rollers (16) of the drive belt (12) and/or applies a corresponding strain force to the drive belt (12) via an additional roller.

17. A method according to claim 14, wherein
the sensor unit includes a weighing device (9) which transmits the weight to the control unit (15).

18. A method according to claim 14, wherein
the sensor unit (8) includes an optical sensor which transmits information about a filling quantity with material to be conveyed (4) to the control unit (15) and the control unit (15) is adapted to determine a weight from this information.

19. A method according to claim 14, wherein
the sensor unit (8) includes an ultrasonic or X-ray sensor which transmits information about a filling quantity with material to be conveyed (4) and/or specific weight of the material to be conveyed (4) to the control unit (15) and the control unit (15) is adapted to determine a weight from this information.

20. A method according to claim 14, wherein
signal transmitters (10) are provided on the conveyor belt (2) at predetermined distances in the longitudinal direction of the conveyor line (19), the position signals of which signal transmitters are detected by a position sensor (11) which transmits position information to the control unit (15), wherein the control unit (15) is adapted to assign the weight $G_{1-n}$ of the material to be conveyed (4) to the predetermined sections $T_{1-n}$ on the basis of the position information.

* * * * *